Patented June 19, 1923.

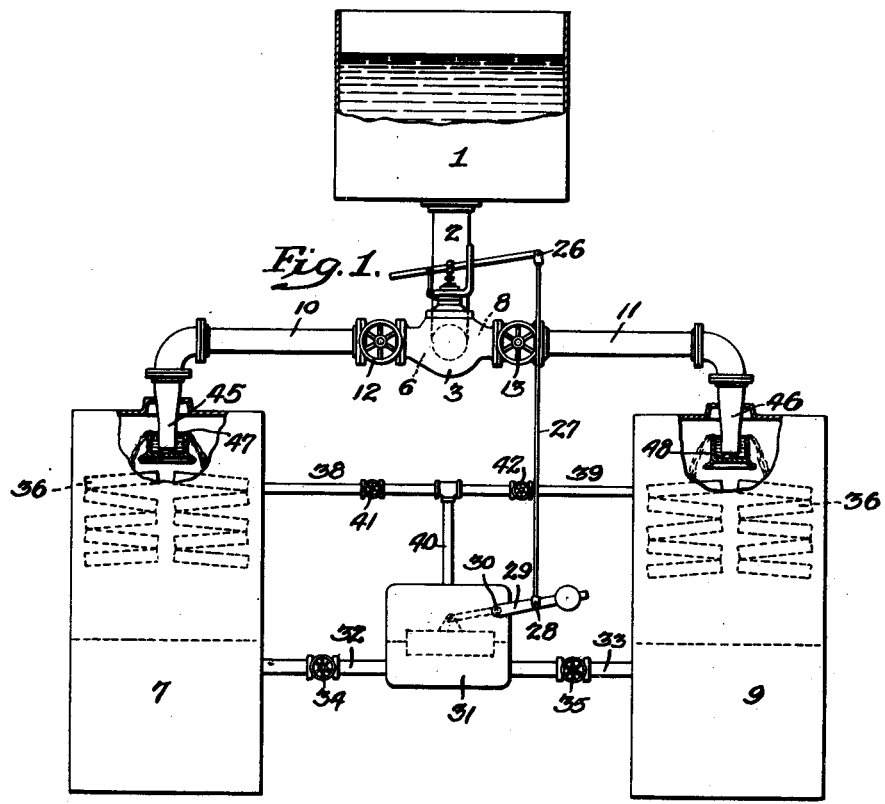

1,459,516

UNITED STATES PATENT OFFICE.

KARL W. ROHLIN, OF PHILADELPHIA, PENNSYLVANIA, ASSIGNOR TO WARREN WEBSTER & COMPANY, OF CAMDEN, NEW JERSEY, A CORPORATION OF NEW JERSEY.

COMBINATION REGULATING VALVE FOR FEED-WATER HEATERS.

Application filed June 16, 1920. Serial No. 389,353.

*To all whom it may concern:*

Be it known that I, KARL W. ROHLIN, a citizen of the United States, and a resident of Philadelphia, Pennsylvania, have invented certain new and useful Improvements in Combination Regulating Valves for Feed-Water Heaters, of which the following is a specification.

My invention relates to devices for controlling the delivery of water to feed water heaters, and the main object of my invention is to provide simple and efficient means for supplying water in uniform or proportionate amounts to each of a plurality of heaters.

A further object of my invention is to provide a single element for controlling the discharge of water to a plurality of heaters in equal or proportionate amounts, depending upon the size of the heaters, through orifices formed in such element.

A further object of my invention is to provide a valve having a plurality of orifices through which water may be discharged in equal or proportionate amounts to a plurality of heaters.

A further object of my invention is to provide a valve having a plurality of apertures of equal area through which equal amounts of water may be delivered simultaneously to a plurality of heaters.

A further object of my invention is to provide a vertically movable valve of the balanced or semi-balanced type having a plurality of apertures of equal and uniform area through which equal amounts of water may be delivered simultaneously to a plurality of heaters.

A further object of my invention is to provide means for cutting off the supply of water to any heater at will, and a still further object is to provide means for insuring an equalization of steam pressure so that heating of the water supply may proceed in each of the several heaters without affecting the operation of any one of the same.

These and other objects of my invention are more fully described hereinafter, reference being had to the accompanying drawings, in which:

Figure 1, is a view in elevation, partly in section, of one form of delivery controlling structure within the scope of my invention.

Fig. 2, is a sectional elevation of one form of valve structure within the scope of my invention, taken on the line II—II, Fig. 3, and Fig. 3, is a cross sectional view on the line III—III, Fig. 2.

In prior attempts to supply water to a plurality of feed water heating units, there has been considerable difficulty in insuring equal or proportionate feed to the several units. The principal object of my invention is to employ a single controlling element to insure that the feed to the several units shall be simultaneous and in uniform or proportionate amounts, depending upon the size of the respective heater or heaters.

In Fig. 1, I have shown my invention in operative relation with respect to a pair of heating units, and in this view, 1 indicates a tank or other source of water supply. As arranged, water from such tank or other source of supply is delivered through a pipe 2, which may lead from the bottom of the tank when employed, to a casing 3, containing a balanced or semibalanced valve 4.

As shown in Figs. 2 and 3, the casing 3 may be divided into a series of chambers, comprising an inlet chamber 5, an outlet chamber 6 leading to a feed water heating unit 7, and an outlet chamber 8 leading to a feed water heating unit 9; pipes 10 and 11 serving as the means of communication between the respective outlet chambers 6 and 8, and the respective heating units 7 and 9, and such pipes are preferably provided with valves 12 and 13.

The top and bottom walls of the chamber 5 are pierced at 14 and 15, and these apertures are provided with valve seats, preferably beveled, upon which may seat the flanges 16 and 17 of the balanced or semi-balanced valve 4. In the present instance this valve is in the form of a hollow shell with a hollow extension 4ª; the shell and extension being apertured at 18 and 19 respectively, so that as said valve lifts from its seats water will flow simultaneously through said apertures to the outlet chambers 6 and 8 respectively. When the feed water heaters are of the same capacity, the ports or apertures 18 and 19 are of the same size or area so that equal amounts of water will flow through the same to the respective heaters. When the feed water heaters are of different capacity the area of the apertures will be in direct proportion to the required feed.

The valve 4 is provided with a stem 20 passing through a suitable stuffing box 21, and being pivotally connected at 22 to a lever 23, fulcrumed at 24, and guided by a slotted arm 25. The free end of said lever may be connected at 26 to a connecting link 27, the lower end of which may be connected at 28 to a float lever 29, pivoted at 30 to a float box 31; the latter being in direct communication with the water spaces of the heating units, by means of pipes 32 and 33, valved at 34 and 35, respectively.

The heaters 7 and 9 contain the usual perforated trays 36 through which the feed water passes in contact with a supply of steam (from any suitable source, not shown) whereby it may be heated; said steam spaces being in communication with each other and with the upper part of the float box by means of pipes 38, 39 and 40 and the pipes 38 and 39 being valved at 41 and 42 respectively.

The discharge nozzles 45 and 46 of the supply pipes 10 and 11 deliver to spill boxes 47 and 48 mounted in the upper portions of the respective heaters; said nozzles being sealed by the bodies of water in said spill boxes so that no steam may escape therefrom, and the nozzles closely fit the shells of the heating units thereby preventing escape of steam and insuring proper heating of the water delivered thereto.

As may be readily understood the heating units are provided with suitable means (not shown) whereby the water heated thereby will be discharged to the desired point of use and the amount of water in the float box controls the position of the balanced or semibalanced valve 4 within the casing 3 and thereby controls the amount of water delivered to the respective heaters through said valve. Any fluctuation in this feed simultaneously affects delivery to the respective heating units so that the quantity fed is the same in each instance. While I have shown single heaters receiving simultaneous supplies of water from opposite sides of the valve casing, it will be understood that the delivery chambers in the valve casing can be increased in number so that delivery to correlated heating units, greater than a pair, can be effected simultaneously.

While I have shown a form of balanced or semi-balanced valve controlling the supply to the respective heaters, it is obvious that a piston valve arranged to control apertures in the side walls of the chamber 5 may be employed, without departing from my invention. When a balanced or semi-balanced valve is employed such as I have shown and described, the areas of the ports or apertures in the shell of the same affording communication with the respective outlet chambers will have the same area or be directly proportionate to the feed water heaters so that simultaneous feed of exactly the same or proportionate amounts of water to each heating unit will take place. Additionally, by connecting the water spaces of each heater with the float box, the water in each heater is maintained at the same level.

In my improved structure the ports controlled by the valve or equivalent element are proportionate to the size of the heaters fed. Where the capacity of the heaters is equal the feed will be equal, and in all instances, the several heaters are fed simultaneously.

I claim:

1. In a device for controlling the delivery of water to a plurality of feed water heaters, the combination of a source of water supply, means for conveying the same to said heaters, a valve element in the line of said communication having independent sets of ports in different horizontal planes, the respective sets of ports of said valve element being of an area to feed equal or proportioned amounts of water to each of said feed water heaters, and means for controlling the vertical position of said valve element whereby equal or proportioned feed to a plurality of heaters may take place simultaneously when the ports of the same are opened.

2. In a device for controlling the delivery of water to a plurality of feed water heaters, the combination of a source of water supply, a ported valve controlling the passage of water from such source and having ports in different planes; said valve being arranged to uncover a plurality of independent ports leading respectively to a plurality of feed water heaters and the respective sets of ports of said valve being of an area to feed equal or proportioned amounts of water to each of said feed water heaters, and means for controlling the vertical position of said valve whereby feed to a plurality of heaters may take place simultaneously when the valve is opened.

3. In a device for controlling the delivery of water to a plurality of feed water heaters, the combination of a source of water supply, a ported valve controlling the passage of water from such source; said valve having a plurality of independent sets of ports in different horizontal planes which, when uncovered, lead respectively to a plurality of feed water heaters; the respective sets of ports of said valve being of an area to feed equal amounts of water to each of said feed water heaters, and means for controlling the vertical position of said valve whereby feed to a plurality of heaters may take place simultaneously when the valve is opened.

4. In a device for controlling the delivery of water to a plurality of feed water heaters, the combination of a casing having an inlet and plurality of outlets, connections between said outlets and separate feed water heaters, a plurality of chambers in said casing, one of said chambers constituting an inlet chamber and having ports in different horizontal planes leading to the other chambers which constitute outlet chambers, a movable member controlling said ports and having independent sets of apertures for delivery through said ports in different planes whereby opening of the same will result in simultaneous flow of water from said inlet chamber, and means for regulating the position of said movable member.

5. In a device for controlling the delivery of water to a plurality of feed water heaters, the combination of a casing having an inlet and plurality of outlets, connections between said outlets and separate feed water heaters, a plurality of chambers in said casing, one of said chambers constituting an inlet chamber and having ports in different horizontal planes leading to the other chambers which constitute outlet chambers, a valve controlling said ports and having independent sets of apertures for delivery through said ports in different planes whereby opening of the same will result in simultaneous and equal flow of water from said inlet chamber to the several outlet chambers, and means for regulating the position of said valve.

6. The combination of a valve casing having a plurality of chambers one of which constitutes an inlet chamber while the others constitute outlet chambers, a source of water supply communicating with said inlet chamber, a valve disposed in said inlet chamber and controlling flow to said outlet chambers in different planes, said valve having independent sets of ports in different planes and when open discharging simultaneously to said outlet chambers, and means for automatically operating said valve to insure simultaneous flow of water from said inlet chamber to the several outlet chambers.

7. The combination of a valve casing having a plurality of chambers one of which constitutes an inlet chamber while the others constitute outlet chambers, a source of water supply communicating with said inlet chamber, a vertically movable valve disposed in said inlet chamber and controlling flow to said outlet chambers in different planes, said valve having independent sets of ports in different planes and when open discharging equal amounts of water simultaneously to said outlet chambers, and means for automatically operating said valve to insure simultaneous flow of water from said inlet chamber to the several outlet chambers.

8. The combination of a valve casing having an inlet and plurality of outlets, means for connecting said outlets with separate feed water heaters, a plurality of chambers in said casing, one of said chambers constituting an inlet chamber and having upper and lower ports in different horizontal planes leading to the other chambers which constitute outlet chambers, a valve having independent sets of openings in different planes for registry with said ports whereby opening of said valve will result in the simultaneous flow of water from said inlet chamber to the outlet chambers for delivery to the respective feed water heaters, and means for regulating the position of said valve.

9. The combination of a valve casing having an inlet and plurality of outlets, means for connecting said outlets with separate feed water heaters, a plurality of chambers in said casing, one of said chambers constituting an inlet chamber and having upper and lower outlet ports in different horizontal planes leading to the other chambers which constitute outlet chambers, a valve having independent sets of openings in different planes for registry with said outlet ports whereby opening of said valve will result in the simultaneous flow of water from said inlet chamber to the outlet chambers for delivery to the respective feed water heaters; the several ports of said valve being of the same area whereby equal amounts of water will be delivered thereby, and means for regulating the position of said valve.

In witness whereof I have signed this specification.

K. W. ROHLIN.